Patented Feb. 18, 1930

1,747,281

UNITED STATES PATENT OFFICE

ROSS A. BAKER AND CARLOS C. CARPENTER, OF SYRACUSE, NEW YORK

METHOD OF AND PRODUCT FOR PROMOTING PLANT GROWTH

No Drawing.  Application filed June 30, 1927.  Serial No. 202,743.

This invention relates to a plant growth promoter and to the method of producing the same.

It is well-known that under normal conditions, a green plant has but two sources of nourishment, soil and air, and that its life and growth are largely dependent upon the relatively small percentage (more or less), of carbon dioxide ($CO_2$) contained in the air and taken up by absorption into the leaf cells of the plant.

This method is necessarily slow and it is, therefore, desirable to use artificial means for increasing the aerial carbon dioxide content in the immediate vicinity of the plant.

To this end, we have discovered a suitable combination of materials which, when moistened, will generate and liberate a more highly concentrated carbon dioxide constituent in the air in the immediate vicinity of the plant to be taken up by such plant.

The main object of the present invention is to provide a more economical and efficient method of stimulating the growth of vegetation than has heretofore been practiced by combining carbonate of an alkaline earth metal with aluminum sulphate in the soil. These substances, when in contact and when moistened by the water in the soil or by the addition of extra moisture, in the immediate vicinity of the vegetation, produce supplementary carbon dioxide to be taken up by absorption through the leaf cells of the plants for supplying the necessary nourishment thereto.

In other words, we have sought to utilize some of the most abundant, and therefore, cheapest, natural materials such as comminuted limestone, dolomite, dolomitic limestones or suitable carbonates, calcium carbonate ($CaCO_3$), magnesium carbonate ($MgCO_3$) and analogous substances, all, or any of which, may be mixed with a second comminuted material such as aluminum sulphate or alum or any salt of sulphuric acid and a relatively weak base. These substances may be mixed separately in the soil or may be mixed together in advance and added to the soil in the form of a dry pulverulent product.

The prepared mixture may be retained in dry packages for indefinite periods of time and, when mixed in suitable quantities with soil containing more or less moisture and to which additional moisture may be added if necessary, generates concentrated carbon dioxide which greatly stimulates the growth of the plants in such soil.

This fertilizer does not produce a noticeable burning effect on the roots of the plant and may be used in considerable excess without harm.

One formula and reaction which has been found to be economical and expeditious may be symbolized as follows:—

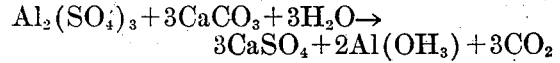
$$Al_2(SO_4)_3 + 3CaCO_3 + 3H_2O \rightarrow 3CaSO_4 + 2Al(OH)_3 + 3CO_2$$

The aluminum sulphate, being a salt of a relatively weak base $Al(OH)_3$ and a relatively strong acid ($H_2SO_4$), hydrolyzes to produce free acid which immediately reacts with the carbonate present to produce carbon dioxide.

In this formula the aluminum sulphate $Al_2(SO_4)_3$ and calcium carbonate $CaCO_3$ may be used in equal parts by weight.

Briefly stated, the method of preparing the product consists in (1) crushing or pulverizing the limestone or other compounds, (2) mixing the crushed limestone with crushed aluminum sulphate, alum or similar substance, in the correct proportions and (3) finally mixing this product with the soil whereby the moisture of the soil or additional moisture will liberate and distribute the carbon dioxide in concentrated form for the stimulation of plant growth by aerial fertilization.

What we claim is:—

1. The method of promoting plant growth which comprises incorporating in the soil in the vicinity of the plants, material containing a carbonate of an alkaline earth metal and also incorporating in said soil a material containing aluminum sulphate.

2. The method of promoting plant growth which comprises incorporating in the soil in the vicinity of the plants, calcium carbonate together with aluminum sulphate.

3. A composition for admixture with soil to promote plant growth comprising a material containing a carbonate of an alkaline earth metal and aluminum sulphate.

4. A composition for admixture with soil to promote plant growth comprising calcium carbonate and aluminum sulphate.

In witness whereof we have hereunto set our hands this 14th day of June, 1927.

ROSS A. BAKER.
CARLOS C. CARPENTER.